United States Patent [19]
Omori et al.

[11] Patent Number: 4,868,074
[45] Date of Patent: Sep. 19, 1989

[54] BATTERY HOLDER MECHANISM

[75] Inventors: Makoto Omori; Toshinobu Banjo; Shigeo Onoda, all of Itami, Japan

[73] Assignee: Mitsubishi Denki Kabushiki Kaisha, Japan

[21] Appl. No.: 174,901

[22] Filed: Mar. 29, 1988

[30] Foreign Application Priority Data

Mar. 31, 1987 [JP] Japan .................. 62-79924

[51] Int. Cl.$^4$ .............................. H01M 2/10
[52] U.S. Cl. ........................ 429/98; 429/100
[58] Field of Search ............ 429/96, 97, 98, 100

[56] References Cited

U.S. PATENT DOCUMENTS 3,006,139 10/1961 Hug et al. ............... 429/100
4,718,742 1/1988 Utoh et al. ............... 429/100

FOREIGN PATENT DOCUMENTS 0139760 10/1980 Japan .................. 429/98
0026359 3/1981 Japan .................. 429/100
0096275 8/1981 Japan .................. 429/100
62-173155 11/1987 Japan .

Primary Examiner—Donald L. Walton
Attorney, Agent, or Firm—Leydig, Voit & Mayer

[57] ABSTRACT

A battery holder mechanism comprises lower supporting portions for receiving the peripheral edge of a battery holder body from below and upper supporting portions for receiving the same from above when the battery holder body is inserted into a battery inserting opening of a package of an electronic appliance, such as an IC card. The upper and lower supporting portions are provided alternatingly inside an inserting hole of a package.

12 Claims, 3 Drawing Sheets

FIG. I
PRIOR ART
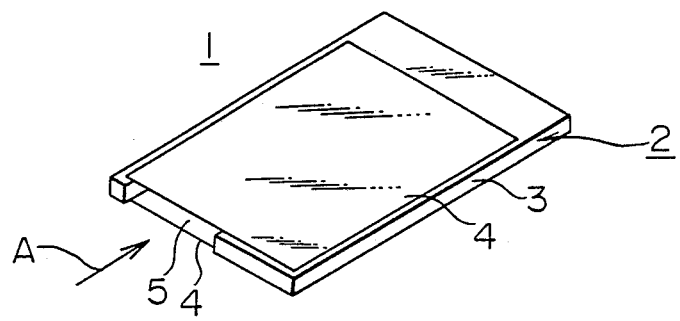
FIG. 2
PRIOR ART
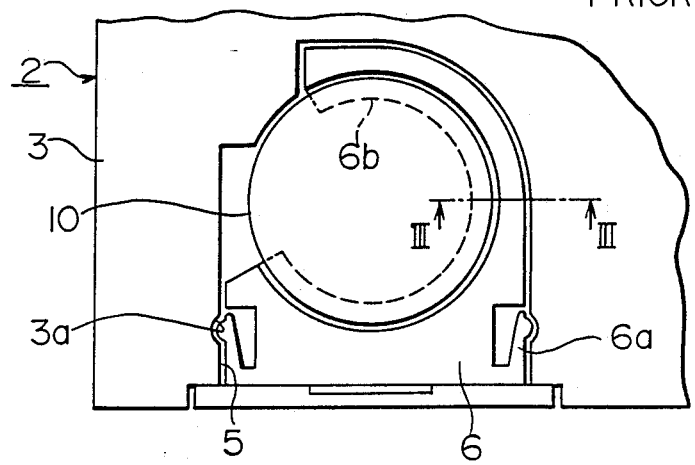
FIG. 3
PRIOR ART
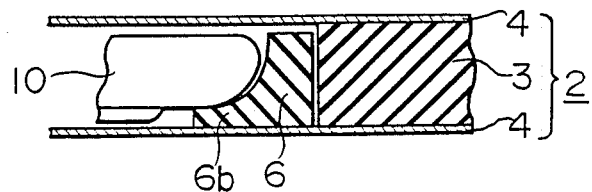

4,868,074

BATTERY HOLDER MECHANISM

BACKGROUND OF THE INVENTION

1. Field of the Invention

The present invention relates to a battery holder mechanism for use in an electrical appliance, such as an IC card used as a game card, a thin-shaped desk-top electronic calculator, and a clock.

2. Description of the Prior Art

FIG. 1 shows a perspective view of a conventional IC card. In the drawing, an IC card 1 accommodates in a package 2 a semiconductor device (not shown) incorporating an electronic part such as an IC chip. The package 2 comprises a frame 3 formed on an insulating material, such as a synthetic resin material, and a pair of metallic panels 4 which are bonded to upper and lower portions of the frame 3, respectively, and coated with an insulating material (not shown) on observe and reverse sides thereof to form covers. A battery inserting opening 5 is formed on the side of a rear portion of the package 2, and a battery holder body 6 (see FIG. 2) supporting a battery is inserted in the direction of the arrow A and is supported therein.

FIG. 2 is a plan view of the battery holder body 6 which is inserted into and supported in the package 2. The battery holder body 6, which is formed of a synthetic resin material and supports a flat-type battery 10, is inserted into the inserting opening provided in the frame 3 and is retained in such a manner that a pair of retaining claws 6a provided on both sides thereof resiliently engage a pair of engaging recesses 3a provided in the frame 3, respectively. A lower projection 6b is provided in this battery holder body 6 along an inner periphery thereof to support the battery 10 from below, as shown in FIG. 3 by way of a cross section.

The card 1 into which the battery 10 is inserted is inserted into a connector (not shown) on the side of a card reader (not shown) and is used after an electrical connection is made therebetween.

However, with a conventional battery holder mechanism for use in the IC card, such as the one described above, there is a clearance in the battery holder body 6 in a vertical direction, and it is not constrained in that direction. Consequently, there has been a problem in that the battery holder 6 moves vertically and bears on the panel 4, and a load is thus applied to the panel 4. In addition, there has been another problem in that when the card 1 is dropped, the battery holder body 6 collides with the panel 4, causing damage to the battery and component parts of the card 1.

SUMMARY OF THE INVENTION

The present invention has been devised to overcome the above-described drawbacks of the prior art, and the object of the present invention is to provide a battery holder mechanism which is capable of preventing a battery holder body from moving vertically inside a package to prevent a load from being applied to a panel, thereby eliminating damage to the battery and component parts.

To this end, in accordance with the present invention, there is provided a battery holder mechanism comprising lower supporting portions for receiving the peripheral edge of the battery holder body from below and upper supporting portions for receiving the same from above when the battery holder is detachably inserted into the battery inserting opening of a package frame, said upper and lower supporting portions being provided alternately inside an inserting opening of the package.

In the present invention, when the battery holder body supporting the battery is inserted into the battery inserting opening of the frame, the battery holder body is supported vertically at a peripheral edge thereof alternately by lower and upper supporting portions provided on the frame and is restrained from moving.

BRIEF DESCRIPTION OF THE DRAWINGS

FIG. 1 is a perspective view of a conventional IC card;

FIG. 2 is a plan view illustrating a battery holder body inserted into a package shown in FIG. 1, with an upper panel removed therefrom;

FIG. 3 is a cross-sectional view taken along the line III—III of FIG. 2;

DESCRIPTION OF THE PREFERRED EMBODIMENT

Figure 4:
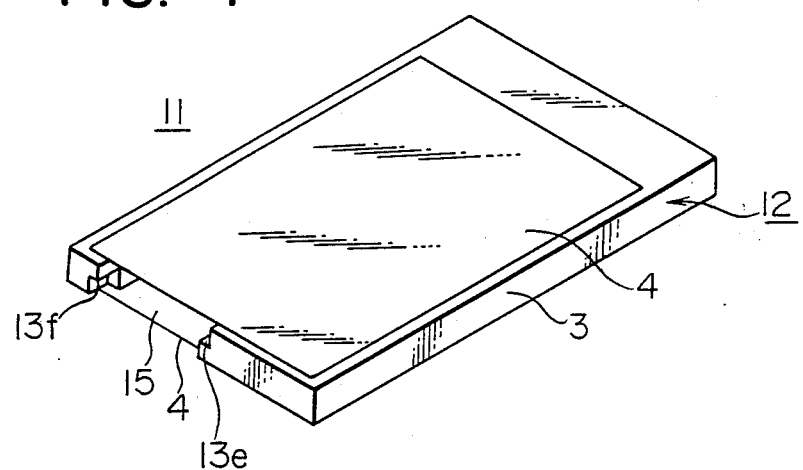
FIG. 4 is a perspective view of an IC card provided with a battery holder mechanism in accordance with an embodiment of the present invention.

FIG. 4 illustrates an IC card 11 incorporating a battery holder mechanism in accordance with the present invention. The card 11 has a package 12 in which a semiconductor device (not shown) is accommodated, and a battery holder body 16 (see FIG. 5) holding a battery is inserted into a battery inserting hole 15 and is supported therein. The package 12 comprises a frame 13 formed of an insulating material and a pair of metallic panels 4 which are bonded to upper and lower surfaces of this frame 13, respectively, and are provided with an insulating coating (not shown) on the surfaces thereof. An upper receiving portion 13f and a lower receiving portion 13e which are formed at an entrance of the inserting opening 15 will be described later with reference to FIG. 5.

Figure 5:
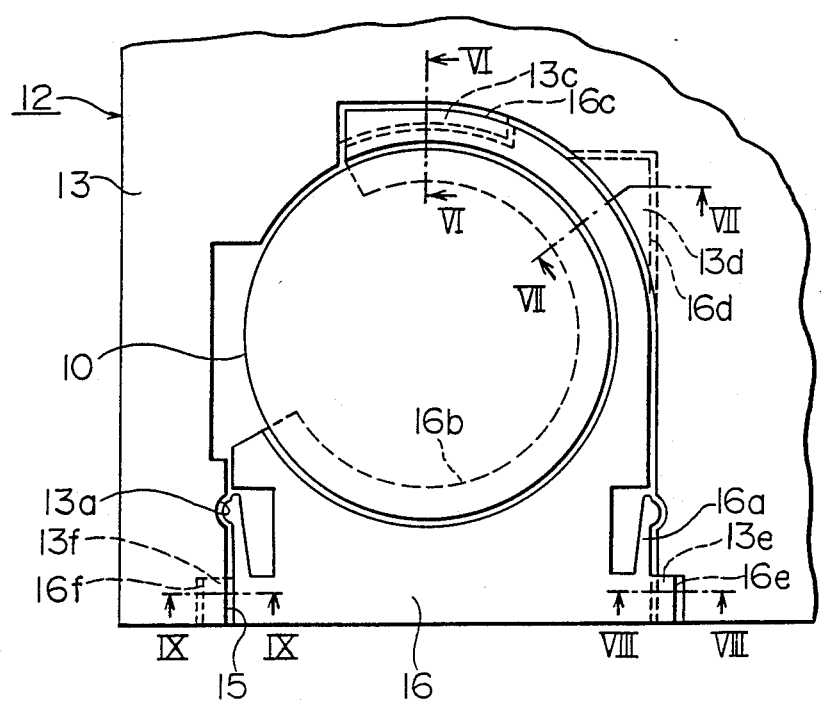
FIG. 5 is a plan view of the battery holder body inserted into the package shown in FIG. 4, with the upper panel removed therefrom.

FIG. 5 is a top plan view of the battery holder body 16 inserted in and supported by the package 12. The battery holder body 16 formed of an insulating material is inserted into the inserting hole 15 of the frame 13. Holder body 16 is retained so that a pair of retaining claws 16a, provided on both sides of the battery holder body 16, respectively engage resiliently a pair of engaging recesses 13a in the frame 13. A lower projection 16b is provided at a lower portion of the battery holder body 16 to project inwardly from an inner peripheral portion and to support the battery 10 from below. In addition, a lower notch 16c, an upper notch 16d, a lower notch 16e, and an upper notch 16f are formed in that order around the outer periphery of the battery holder body 16. A lower receiving portion 13c, an upper receivign portion 13d, a lower receiving portion 13e, and an upper receiving portion 13f are formed in that order in an inner peripheral portion of the inserting opening 15 of the frame 13 in correspondence with the aforementioned notches, so as to hold the battery holder body from above and below. The lower notch 16c is formed by providing a recess in a lower portion of the battery holder body 16 and engages with the lower receiving portion 13c formed by providing a recess in an upper portion of the frame 13. The upper notch 16d is formed by providing a recess in an upper portion of the holder body 16 and engages with the upper receiving portion 13d formed by providing a recess in a lower portion of the frame 13. In addition, the lower notch 16e is formed by providing a recess in the lower portion of the holder body 16 and engages with the lower receiving portion 13e formed by providing a recess in the upper portion of the frame 13. The upper notch 16f is formed by providing a recess in the lowe rportion of the holder body 16 and engages with the upper receiving portion 13f formed by providing a recess in the upper portion of the frame 13. Furthermore, the lower notches 16c and 16e are formed at nutually substantially opposite positions with respect to the center (not shown) of the battery 10, while the upper notches 16d and 16f are also located at substantially opposite positions with respect to the center of the battery 10 and at positions substantially perpendicular to the lower notches 16c and 16e.

Figure 6:
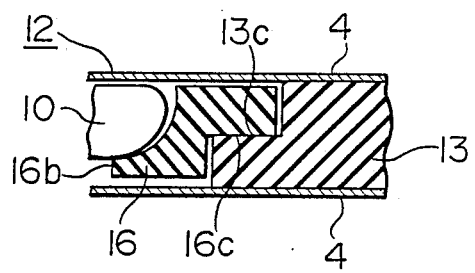
FIG. 6 is a cross-sectional view taken along the line VI—VI of FIG. 5.
Figure 7:
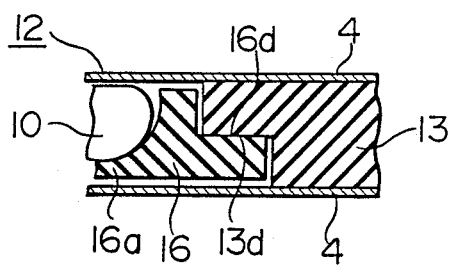
FIG. 7 is a cross-sectional view taken along the line VII—VII of FIG. 5.
Figure 8:
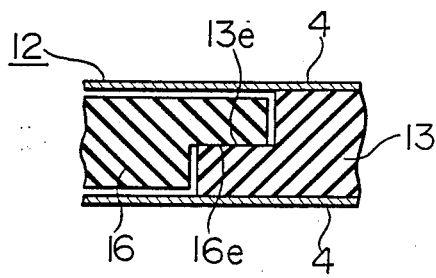
FIG. 8 is a cross-sectional view taken along the line VIII—VIII of FIG. 5.
Figure 9:
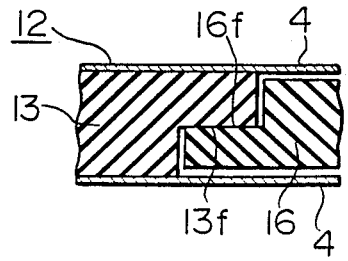
FIG. 9 is a cross-sectional view taken along the line IX—IX of FIG. 5.

FIGS. 6 to 9 are cross sectional views illustrating a state in which the respective notches are receives by the respective receiving portions of the battery holder body 16 in the inserting hole 15 of the frame 13. FIG. 6 shows a innermost position in the inserting hole 15, in which the battery holder body 16 is supported from below by the lower receiving portion 13c. FIG. 7 shows a position which is adjacent to the innermost position in the inserting hole 15, in which the battery holder body 16 is supported from above by the upper receiving portion 13d. FIG. 8 illustrates a position on the right-hand side of the entrance of the inserting hole 15, in which the battery holder body 16 is supported from below by the lower receiving portion 13e. FIG. 9 shows a position on the left-hand side of the entrance of the inserting hole 15, in which the battery holder body 16 is supported from above by the lower receiving portion 13f. Thus, the battery holder 16 is supported alternately from above and below and can be held stably without moving vertically, i.e., toward panels 4.

As has been described above, in accordance with the present invention, since a plurality of supporting portions for supporting the peripheral edge of the battery holder alternatingly from above and below are provided in a battery inserting opening portion of the frame, the battery can be held stably, so that a load applied to the panel can be eliminated, and it is therefore possible to prevent damage which would otherwise occur in component parts.

Incidentally, the numbers of vertically constraining and supporting portions which consist of the receiving portions 13c–13f formed in the frame 13 and the notches 16c–16f formed in the battery holder body 16, as well as a method of their formation and positions at which they are formed should not be restricted to the above-described embodiment. Any desired number of vertically constraining, complementary and supporting portions may be formed around the outer periphery of the battery holder body 16 and the inner periphery of the frame 13.

What is claimed is:

1. A battery holder comprising a generally flat body having an axis disposed generally transverse to said flat body, means for receiving a battery, and a periphery for slidably engaging a battery holder means in a direction transverse to said axis, said periphery including at least one projection and at least one recess lying along a direction transverse to said axis for engaging complementary recesses and projections on said battery holder means and for restraining movement of said battery holder relative to said battery holder means along said axis when said battery holder and said battery holder means are engaged.

2. The battery holder of claim 1 including at least two of said projections and two of said recesses.

3. The battery holder of claim 2 wherein said body has opposed top and bottom sides and wherein said projections and recesses are alternatingly disposed along said periphery at said top and bottom sides.

4. The battery holder of claim 2 wherein said body has opposed front and rear sides along its periphery and wherein one recess and one projection are disposed along said rear side.

5. The battery holder of claim 1 wherein said periphery includes at least one projection lying along said axis for engaging a complementary recess on said battery holder for releasably retaining said battery holder in said battery holder means.

6. The battery holder of claim 1 wherein said means for receiving a battery comprises a hole in said body and a flange extending into said hole for supporting a battery.

7. A battery-powered electrical appliance and a battery holder for holding a battery within said appliance, said appliance including a battery holder means including a first opening and an internal wall adjoining said opening for receiving a battery holder, said battery holder comprising a generally flat body having an axis disposed generally transverse to said flat body, means for receiving a battery, and a periphery for slidably engaging said battery holder means in a direction transverse to said axis, said periphery including at least one projection and at least one recess lying along a direction transverse to said axis for engaging complementary recesses and projections on said internal wall and for restraining movement of said battery holder relative to said battery holder means along said axis when said battery holder and said battery holder means are engaged and wherein said internal wall includes at least one recess and at least one projection for engaging said complementary at least one projection and at least one recess on said battery holder.

8. The combination of claim 7 including at least two projections and at least two recesses on each of said periphery and said internal wall for complementary engagement.

9. The combination of claim 8 wherein said body has opposed top and bottom sides and wherein said projections and recesses are alternatingly disposed along said periphery at said top and bottom sides.

10. The combination of claim 8 wherein the body has opposed front and rear sides along its periphery, and wherein one recess and one projection are disposed along said rear side of said periphery for engaging said internal wall adjacent said opening.

11. The combination of claim 7 including at least one projection on said periphery lying along said axis and a complementary recess disposed on said internal wall lying along said axis for releasably retaining said battery holder in said battery holder means.

12. The combination of claim 7 wherein said means for receiving a battery comprises a hole in said body and a flange extending into said hole for supporting a battery.

* * * * *